United States Patent [19]

Merkel

[11] Patent Number: 5,768,094
[45] Date of Patent: Jun. 16, 1998

[54] BISTABLE MECHANISM FOR COLLAPSING AND ELEVATING A KEYBOARD IN A PORTABLE COMPUTER

[75] Inventor: Harold S. Merkel, Houston, Tex.

[73] Assignee: Compaq Computer Corporation, Houston, Tex.

[21] Appl. No.: 839,067

[22] Filed: Apr. 23, 1997

[51] Int. Cl.$^6$ .............................. G06F 1/16; F16H 21/54; H05K 7/04; B41J 11/56

[52] U.S. Cl. .................. 361/680; 74/97.1; 74/100.1; 74/100.2; 400/490; 400/682

[58] Field of Search .................. 364/708.1; 400/479, 400/488, 490–492, 682; 200/54, 344, 345; 235/1 D, 145 R, 146; 341/22; 361/680; 74/97.1, 100.1, 100.2, 527

[56] References Cited

U.S. PATENT DOCUMENTS 5,532,904 7/1996 Sellers ........................ 361/680
5,602,715 2/1997 Lempicki et al. .................. 361/680

*Primary Examiner*—Michael W. Phillips
*Attorney, Agent, or Firm*—Konneker & Smith, P.C.

[57] ABSTRACT

A notebook computer is provided with a collapsible keyboard in which a dome sheet with elastomeric key return dome members thereon is horizontally shiftable through elevation and retraction strokes to respectively shift the keys between elevated operating positions in which the domes underlie and support the keys, and retracted positions in which the domes are shifted away from their key-underlying positions. A linkage member interconnected between the computer lid and a drive bar on the dome sheet creates initial triggering movements of the dome sheet through its elevation and retraction strokes in response to opening and closing of the lid. In response to these lid-created triggering movements of the dome sheet, a bistable spring structure connected to the drive bar takes control of the dome sheet and drives it through the balance of the stroke and then releasably retains the fully shifted dome sheet in the resulting stroke end position thereof.

43 Claims, 5 Drawing Sheets

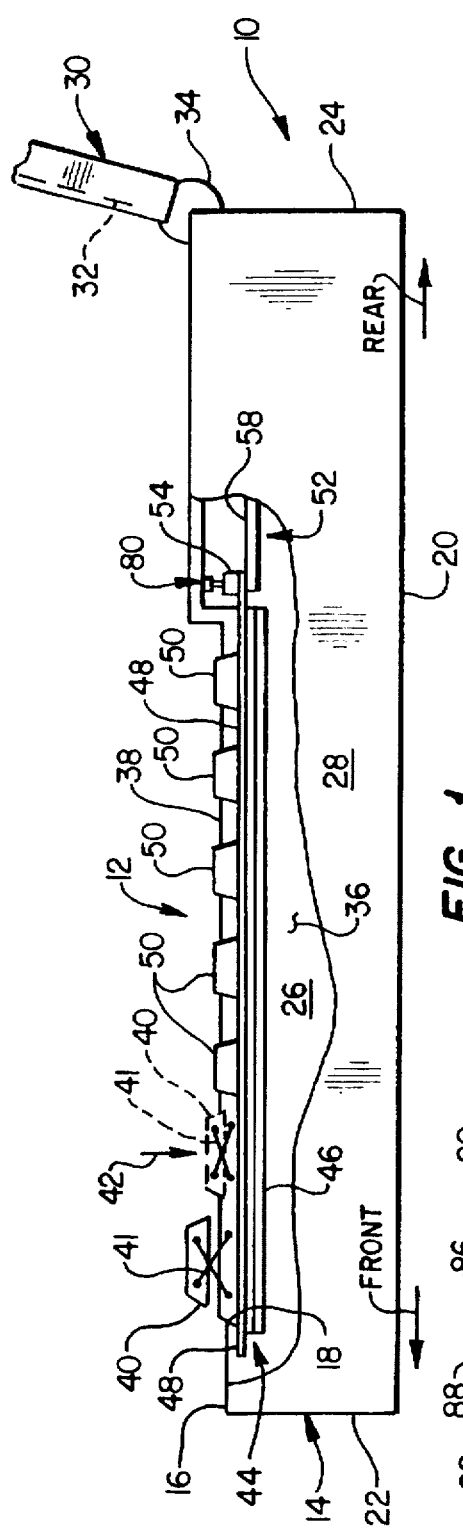
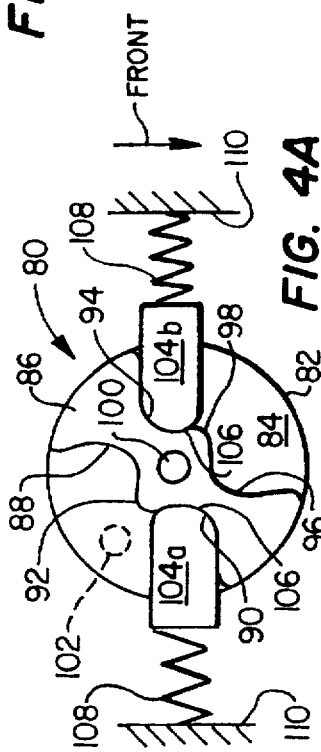
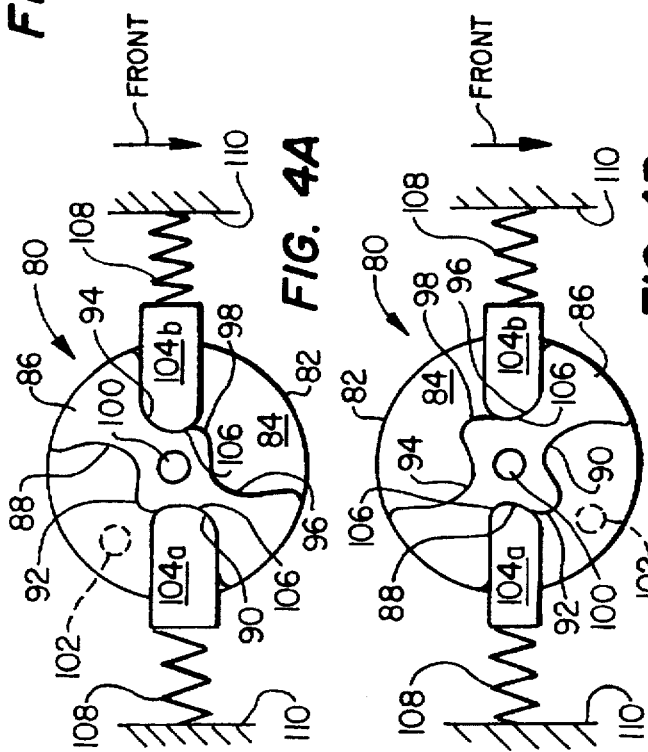

BISTABLE MECHANISM FOR COLLAPSING AND ELEVATING A KEYBOARD IN A PORTABLE COMPUTER

CROSS-REFERENCE TO RELATED APPLICATION

This application discloses subject matter similar to that illustrated and described in U.S. Pat. No. 5,602,715 to Lempicki et al which is hereby incorporated by reference herein in its entirety.

BACKGROUND OF THE INVENTION

1. Field of the Invention

The present invention generally relates to electronic devices and, in a preferred embodiment thereof, more particularly relates to keyboard structures for portable computers such as notebook computers.

2. Description of Related Art

In recent years the notebook computer has made considerable gains in both popularity and technical sophistication. One factor contributing to the increasing popularity of the notebook computer is its ever decreasing size and weight, a factor arising from the ability to fabricate various components of the computer in smaller and smaller sizes while, in many instances, increasing the power and/or operating speed of such components.

One continuing challenge in the design of notebook computers, however, is the keyboard structure. This design challenge arises from two conflicting design goals—the desire to even further reduce the size of the keyboard structure, and the desirability of having the notebook computer emulate as closely as possible the size and typing "feel" of a desktop computer keyboard.

There are, of course, two dimensional factors which may be varied to reduce the size of a notebook computer keyboard structure—its horizontal dimensions (i.e., its length and width), and its vertical or thickness dimension. The horizontal dimensions of the keyboard are governed by the number, size, and relative spacing of the manually depressible key cap portions of the keyboard, and various reductions in these three dimensional factors may be utilized to reduce the overall length and/or width of the keyboard. However, as will be readily appreciated, a reduction in these three configurational aspects to gain a keyboard size reduction correspondingly lessens the similarity of the notebook computer keyboard in appearance, key arrangement and typing feel to its desktop counterpart.

Similar restraints are also presented when attempts are made to reduce the overall thickness of a notebook computer keyboard. One possibility which has been investigated and attempted is to simply reduce the keystroke distance in the notebook computer keyboard compared to its desktop counterpart. Using this design technique, the overall thickness of the notebook computer in its closed storage and transport orientation may be correspondingly reduced. However, this thickness reduction in the overall notebook computer, achieved by reducing the keyboard keystroke distance, creates what many users consider to be an undesirable typing "feel" difference compared to the longer keystroke distance typically found in a larger desktop computer keyboard.

Illustrated and described in U.S. Pat. No. 5,602,715 to Lempicki et al, which has been incorporated herein by reference, is a notebook computer which provides a useful thickness reduction in the closed computer without a corresponding reduction in the operative keystroke distance of the keyboard. This very desirable thickness reduction is achieved in the notebook computer illustrated and described in this patent by providing the computer with a collapsible keyboard.

The keys in this collapsible keyboard are supported on scissored linkage arm assemblies. In response to closing of the computer lid housing, resilient key return dome portions of the keyboard are shifted away from their normal underlying relationships with the keys, and the scissored linkage arm assemblies and keys are forcibly retracted to a storage and transport orientation in which the overall thickness of the keyboard structure is reduced by an amount essentially equal to the stroke distance of the keys.

When the lid is subsequently opened, the key return domes are horizontally shifted back to their normal underlying relationships with the keys, and the keys and scissored linkage arm assemblies are forced outwardly by the return spring portions to their operating orientations above the resilient key return domes.

The key return domes are carried on the top side of a plastic dome sheet which underlies a monoblock structure upon which the keys are movably supported by their scissored linkage arm assemblies, with the dome sheet defining the top layer of a multi-layer signal pad structure. The dome sheet is shifted along the underside of the monoblock structure to cause the domes to cammingly engage portions of the scissored linkage arm assemblies and elevate the keys from their retracted storage and transport positions to their elevated operating positions.

While the collapsible notebook computer keyboard illustrated and described in U.S. Pat. No. 5,602,715 provides a useful reduction in the keyboard thickness when the keys are retracted to their storage and transport orientations, the keyboard structure carries with it the following three disadvantages.

First, the assembly tolerance compensation between the keyboard and the lid structure which creates the requisite shifting of the dome sheet is incorporated in the keyboard and requires that the keyboard achieve its collapsed or retracted position and hold down the keys within a dome sheet translation range of about 5.0 to 6.0 mm. This requirement has proven difficult to meet due to the small space available under the key cap members.

Second, an elongated leaf spring member is used to provide the force on the dome sheet to elevate the keys when the computer lid is opened. The oppositely directed force exerted on the dome sheet to collapse the keys is created by two beak-shaped protrusions on the computer lid housing. When the computer lid is closed, and the keys are collapsed, these lid protrusions keep the sliding dome sheet bar under tension and maintain the leaf spring under compression. These forces place plastic parts under stress for long periods of time and under the many different environmental extremes to which the computer is exposed during transport and storage. This situation increases the risk of product reliability problems due to spring fatigue and stressed or broken plastic parts.

Third, in the sliding dome sheet collapsible keyboard design in U.S. Pat. No. 5,602,715 the sliding bar attached to the dome sheet must extend above the keyboard and under the edge of the computer's lid in order to be operatively engaged by the lid drive beaks during closure. This extension of the keyboard parts adds size and weight to the keyboard, limits the assembly options for securing the keyboard in the computer, and may be less appealing from an aesthetic standpoint than a design which more discreetly conceals the mechanism which collapses and elevates the keys.

It can thus be seen from the foregoing that it would be desirable to provide a portable computer having incorporated therein an improved collapsible keyboard, of the type generally described above, which eliminates or at least substantially alleviates these disadvantages. It is accordingly an object of the present invention to provide a portable computer with such an improved collapsible keyboard incorporated therein.

SUMMARY OF THE INVENTION

In carrying out principles of the present invention, in accordance with a preferred embodiment thereof, an electronic device, representatively a portable notebook type computer, is provided with an improved collapsible keyboard in which spring forces exerted on the key shifting portion of the keyboard during prolonged storage and use conditions of the computer are substantially reduced, with the manual lid opening and closing forces being the primary forces utilized to elevate and collapse the keys.

The portable computer representatively comprises a base housing, and a lid portion secured to the base housing for pivotal movement relative thereto between open and closed positions.

In a preferred embodiment thereof the improved collapsible keyboard incorporated in the portable computer is carried by the base housing and includes a plurality of keys supported for movement between elevated and retracted positions, and shifting means operative to (1) shift the keys from their retracted positions to their elevated positions and (2) permit the keys to move from their elevated positions to their retracted positions in response to movement of the shifting means respectively through (1) an elevation stroke and (2) a retraction stroke.

Representatively, the shifting means include a slidably supported dome sheet upon one side of which a spaced series of elastomeric key return domes are mounted. When the dome sheet is shifted through its elevation stroke, the domes are forced into an underlying supporting relationship with the retracted keys in a manner moving them to their elevated positions. When the dome sheet is shifted through its retraction stroke, the domes are shifted horizontally away from their underlying relationships with their associated keys to permit the previously elevated keys to return to their retracted positions.

Triggering means are provided and are operative to move the shifting means through initial portions of their elevation and retraction strokes in respective response to movement of the lid portion toward its open and closed positions thereof. The triggering means preferably comprise a linkage structure connected to the shifting means and drivably engageable by the lid portion only during an initial portion of its opening movement and a final portion of its closing movement.

In a preferred embodiment thereof, the linkage structure includes a striker member carried by the computer lid portion, a pivotally supported lever member having first and second differently sloped ramped surfaces respectively engageable by the striker member as the lid housing is being opened and closed to cause pivotal movement of the lever member in opposite directions, and a drive member interconnected between the shifting means and the lever member and being translatable in response to rotation of the lever member.

The computer base housing has a front side, and the elevation stroke of the shifting means may be either (1) forwardly directed, with the retraction stroke being rearwardly directed, of (2) rearwardly directed, with the retraction stroke being forwardly directed. Two linkage structure versions are provided to accommodate these two relative elevation/retraction stroke directional relationships.

The portable computer also comprises final drive means operative to move the shifting means through final portions of their elevation and retraction strokes in respective response to movement of the shifting means by the triggering means through the aforementioned initial portions of the elevation and retraction strokes.

The final drive means preferably include a bistable spring structure drivingly connected to the shifting means and operative to move the shifting means through final portions of their elevation and retraction strokes, and then releasably and resiliently retain the shifting means in the resulting stroke end position thereof, in respective response to movement of the shifting means through the aforementioned initial portions of their elevation and retraction strokes.

The bistable spring structure is representatively provided in a variety of embodiments including:

(1) a body portion supported for rotation relative to the shifting means and drivingly connected thereto, and a spring portion engaging the body portion in a manner permitting the body portion to rotate between two stable positions through an intermediate unstable position;

(2) various spring structures having generally V-shaped portions resiliently engaging corresponding spaced pairs of oppositely ramped drive surfaces operatively disposed on the shifting means; and (3) a pair of telescoped, axially spring-biased tie rod assemblies each having a first end pivotally connected to the shifting means, and a second end pivotally supported external to the shifting means.

BRIEF DESCRIPTION OF THE DRAWINGS

FIG. 1 is a highly simplified, partially cut away side elevational view of a notebook computer which incorporates therein a specially designed collapsible keyboard structure embodying principles of the present invention;

FIG. 4 is an enlarged scale fragmentary partial perspective view of a rear end portion of the dome sheet and a portion of a bistable spring structure used to shift the dome sheet through final portions of its elevation and retraction strokes;

FIGS. 4A and 4B are enlarged scale schematic top plan views of the bistable spring structure and sequentially illustrate its operation;

DETAILED DESCRIPTION

Figure 2:
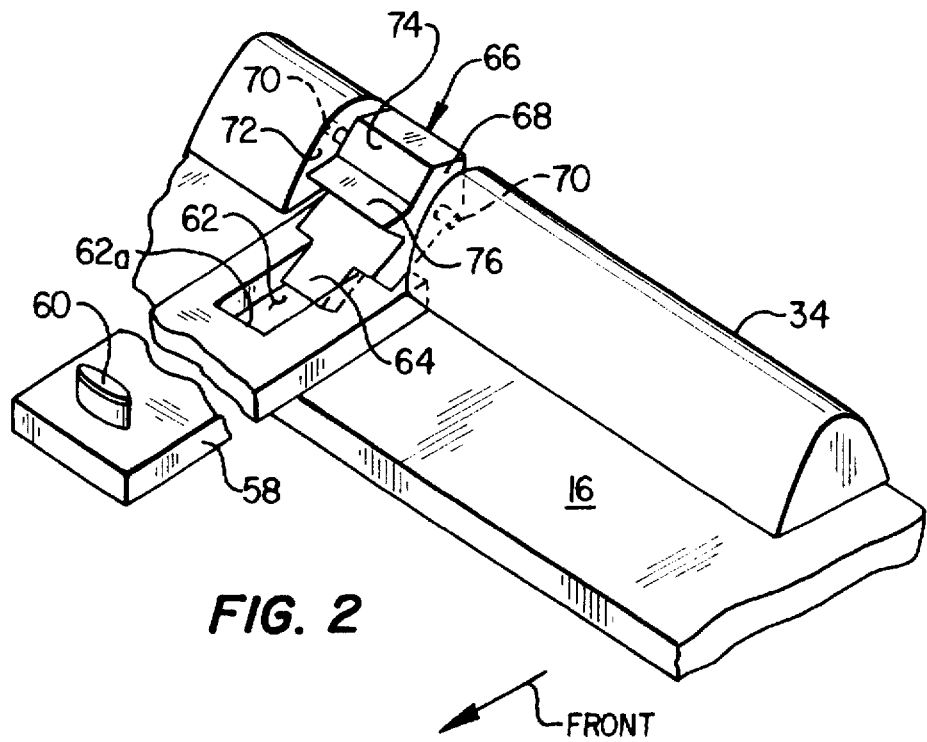
FIG. 2 is an enlarged scale fragmentary interior perspective view of a rear portion of the computer base housing and illustrates a linkage structure used to impart a translational triggering movement to a dome sheet portion of the keyboard.

Illustrated in simplified, partially cut away side elevational form in FIG. 1 is an electronic device, representatively a portable, notebook type computer 10, which incorporates therein a specially designed collapsible keyboard structure 12 embodying principles of the present invention. Computer 10 includes a hollow rectangular base housing 14 having a top horizontal side wall 16 with an opening 18 therein; a bottom horizontal side wall 20; front and rear vertical end walls 22,24; and a pair of opposite vertical side walls 26,28.

A hollow rectangular lid housing 30, having a display screen 32 on its front or inner side, is pivotally secured along a hinge joint structure 34 to a top rear corner portion of the base housing 14. Lid housing 30 may be upwardly pivoted to place the computer 10 in an open use orientation (FIG. 1) in which the top side 16 of the base housing 14 is exposed and the display screen 32 forwardly faces the user of the computer, or downwardly pivoted to place the computer 10 in a closed storage and transport orientation (FIG. 12) in which the lid housing extends across and covers the top side of the base housing 14. Suitable latch means (not shown) are provided to releasably retain the lid housing 30 in its closed orientation.

With the important exceptions noted below, the collapsible keyboard structure 12 is similar to the sliding dome sheet type collapsible notebook computer keyboard structure illustrated and described in the aforementioned U.S. Pat. No. 5,602,715 which has been incorporated herein by reference. Still referring to FIG. 1, collapsible keyboard 12 extends across the opening 18 in the top side wall 16 of the base housing 14 and occupies only a relatively small upper portion of the interior 36 of the base housing 14. The collapsible keyboard 12 basically comprises a relatively thin rectangular monoblock support structure 38 that horizontally extends across the base housing top side opening 18 and is suitably anchored to the base housing 14; and a series of manually depressible key cap members 40 each carried by a scissored linkage assembly 41 for vertical movement relative to the support structure 38 (as indicated by the arrow 42 in FIG. 1) between an elevated solid line use orientation, and a downwardly retracted dotted line storage and transport orientation.

Underlying the monoblock support structure 38 is a multilayer signal pad structure 44 having a bottom layer defined by a metal backing sheet 46, and a top layer defined by a plastic base member or dome sheet 48 which is sandwiched between the bottom side of the monoblock support structure 38 and the balance of the signal pad structure 44. Dome sheet 48 carries on its top side a spaced series of resilient key return spring members representatively in the form of elastomeric dome members 50, and is slidable relative to the stationary monoblock structure 38 and the stationary balance of the signal pad structure leftwardly or forwardly through a key elevation stroke, and rightwardly or rearwardly through a key retraction stroke.

As more fully described in U.S. Pat. No. 5,602,715, the shifting of the dome sheet 48 through its elevation stroke, initiated in response to the opening of the lid housing 30, causes the elastomeric domes 50 to be cammingly driven under the retracted key caps 40 and raise them from their dotted line retracted positions to their solid line elevated operating positions. With the key cap members 40 in these elevated operating positions they may be manually depressed to operatively activate, via their associated domes 50, underlying conventional switch circuitry in the signal pad structure 44. A subsequent reverse movement of the dome sheet 48 through its retraction stroke, initiated by a closing of the lid housing 30, shifts the domes 50 away from their underlying supporting relationships with the key caps 40 and causes the retraction of the key caps 40 to their dotted line storage and transport orientations as more fully described in U.S. Pat. No. 5,602,715 incorporated by reference herein.

As will now be described, the present invention provides a substantially improved drive structure operative to selectively shift the dome sheet 48 through its elevation and retraction strokes. More specifically, with reference now to FIGS. 1–4, the dome sheet 48 is drivably connected to the pivotal lid housing 30 by a specially designed linkage structure 52 (see FIGS. 1 and 3). Linkage structure 52, in response to opening the lid housing 30, operates to shift the dome sheet 48 through an initial or triggering portion of its elevation stroke and, in response to closing the lid housing 30, operates to shift the dome sheet 48 through an initial or triggering portion of its retraction stroke.

The linkage structure 52 includes an elongated rectangular plastic slide bar 54 suitably anchored to and longitudinally extending along a rear side edge portion of the dome sheet 48 and having an elongated central slot 56 formed therein. The front end of an elongated rectangular drive bar 58 has an upwardly projecting boss 60 disposed thereon and extending upwardly into the slide bar slot 56. Drive bar 58 is transverse to the slide bar 54, is suitably supported for driven movement in a front-to-rear direction within the base housing 14, and has an elongated slot 62 formed in its rear end and having front and rear end surfaces 62a and 62b.

Figure 3:
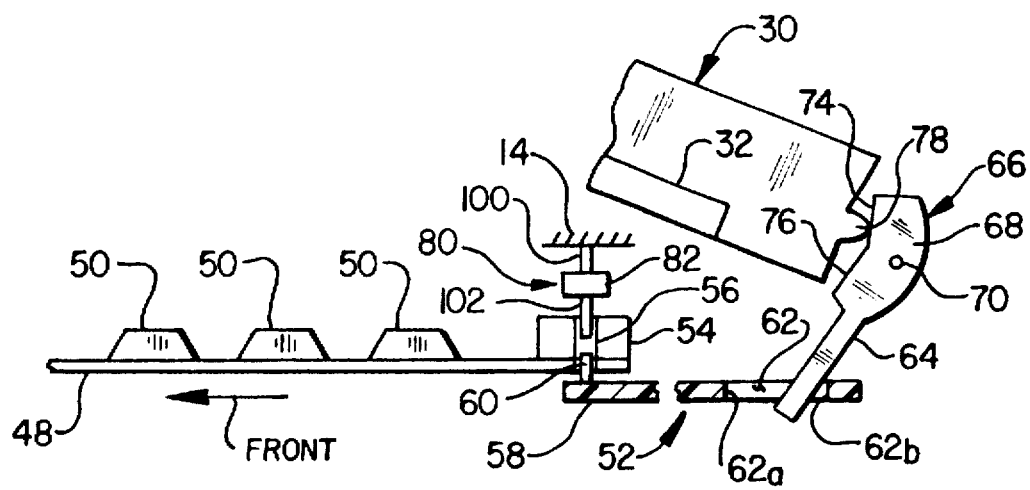
FIG. 3 is a highly schematic reduced scale cross-sectional view through the computer illustrating the linkage structure connected to the dome sheet.

A downwardly extending lower rectangular tab portion 64 of a rotatable lever member 66 (see FIGS. 2 and 3) is downwardly received within the slot 62, with an upper end portion 68 of the lever member 66 being pivotally secured, by pins 70, within a recess 72 in the lid hinge structure 34. As best illustrated in FIGS. 2 and 3, the upper end portion 68 of the lever member 66 has a pair of mutually angled, generally planar upper and lower ramp surfaces 74,76 formed on its front side. The linkage structure 52 also includes a striker projection 78 formed on a rear side edge portion 30a of the lid housing 30 and positioned to operatively engage the ramp surfaces 74,76 in a manner subsequently described herein in response to opening and closing the lid housing 30.

As best illustrated in FIGS. 4–4B, the overall dome sheet drive structure also includes a bistable spring structure 80 interconnected between the base housing 14 and the slide bar 54. In a manner subsequently described herein, the bistable spring structure 80 functions to drive the dome sheet 48 through final portions of its elevation and retraction strokes in respective response to the dome sheet 48 being driven through initial triggering portions of its elevation and retraction strokes by the linkage structure 52 caused by opening and closing of the lid housing 30.

Bistable spring structure 80 includes a generally disc-shaped body portion 82 positioned above a longitudinally central portion of the slide bar 54 and having a top side 84 from which a diametrically extending drive projection 86 upwardly projects. Drive projection 86 has, along one of its opposite sides, a pair of arcuate indentations 88,90 with a curved lobe projection 92 positioned therebetween. On the other side of the drive projection are a pair of arcuate indentations 94,96 with a curved lobe projection 98 positioned therebetween and being directly opposite the lobe projection 92.

A central cylindrical mounting pin 100 projects upwardly from a longitudinally central portion of the drive projection 86 and is rotatably received in a corresponding opening in the base housing wall structure, and a peripheral cylindrical drive pin 102 projects downwardly from the bottom side of the body portion 82 and is slidingly received in the slide bar slot 56. The bistable spring structure 80 also includes an opposing pair of left and right force exerting members 104a,104b (as viewed in FIGS. 4A and 4B), with facing rounded outer ends 106, which are resiliently biased toward one another by a pair of schematically depicted spring members 108 compressed between the force exerting members 104 and suitable support structures 110 disposed within the base housing 14.

When the lid housing 30 is closed, the dome sheet 48 is at the rear end of its retraction stroke, the drive bar 58 is at the rear end of its front-to-rear stroke, the key caps 40 in their retracted storage and transport positions, and the bistable spring structure 80 is in its FIG. 4A initially stable position with the outer ends 106 of the force exerting members 104a,104b being respectively received in the drive projection side indentations 90 and 94. As the lid housing 30 is opened (i.e., pivoted in a clockwise direction as viewed in FIGS. 1 and 3), the striker projection 78 (see FIG. 3) forcibly engages and travels across the upper ramp surface 74, causing the lever member 66 to pivot in a clockwise direction as viewed in FIG. 3 to thereby cause the tab portion 64 to forcibly engage the slot end surface 62a and forwardly move the drive bar 58 away from its rearwardly shifted position.

In turn, via the engagement of the boss 60 with the slide bar 54, this forwardly moves the dome sheet 48 through an initial triggering portion of its forward elevation stroke. As the dome sheet 48 moves through this initial elevation stroke position, under the mechanically advantages lid force being exerted thereon, the forward force exerted on the spring structure drive pin 102 by the slide bar 54 begins to rotate the bistable spring structure body portion 82 in a counter-clockwise direction away from its FIG. 4A first or rear stable position.

Such counterclockwise rotation of the body portion 82 cams the force exerting members 104a,104b outwardly away from one another, against the resilient resistance of the springs 108, as the body portion 82 rotationally approaches an unstable intermediate position in which the outer tip portions of the oppositely directed central drive projection lobes 92,98 respectively engage the outer ends 106 of the force exerting members 104a,104b. As the dome sheet 48 continues to be forwardly driven by the drive bar 58 (see FIGS. 2 and 3), the bistable spring structure body portion 82 is rotationally driven in a counterclockwise direction past this intermediate unstable point at which time the springs 108 rotationally snap the body portion 82 to its second or forward stable position shown in FIG. 4B.

As the body portion 82 rotationally reaches its FIG. 4B second or forward stable position, the continuing rotation of its drive pin 102 about the axis of the mounting pin 100 forwardly drives the dome sheet 48 through the balance of its elevation stroke to elevate the key cap members 40 to their solid line use orientations shown in FIG. 1.

During this driven rotation of the body portion 82 from its central unstable position to its second or forward stable position, and the corresponding spring-driven forward translation of the dome sheet 48 through the balance of its forward elevation stroke, the tab portion 64 (see FIGS. 2 and 3) is disengaged from the front slot end 62a, thereby disengaging the lid housing 30 from the dome sheet 48 and permitting the lid housing 30 to be pivoted through the rest of its opening stroke. Representatively, the mechanically advantaged lid force is exerted on the dome sheet 48, to move it through an initial portion of its elevation stroke, through only about the first 45 degrees of pivotal opening movement of the lid housing 30. After this initial pivotal opening movement of the lid housing 30, the now unstable spring structure 80 "takes over" from the lid housing 30 and drives the dome sheet 48, which serves as a base structure for the domes 50, through the balance of its forward elevation stroke and then resiliently and releasably "latches" the dome sheet in this forwardmost position thereof.

When the lid housing 30 is subsequently closed, the dome sheet 48 does not begin to be rearwardly shifted through its retraction stroke until during about the last 45 degrees or so of the lid housing's closing movement. As the lid housing 30 begins to pivot in a counterclockwise direction (as viewed in FIGS. 1 and 3) through this final pivotal increment, the striker projection 78 (FIG. 3) forcibly engages and travels along the lower ramp surface 76, thereby displacing the ramp surface 76 down and causing the lever member 66 to pivot in a counterclockwise direction about pins 70.

This counterclockwise pivoting of the lever member 66 causes the tab portion 64 to rightwardly engage the rear slot end surface 62b (see FIG. 3) and rearwardly drive the dome sheet 48, via the drive bar 58, through an initial or triggering portion of its rearward retraction stroke. Initial rearward movement of the dome sheet 48 through its retraction stroke exerts a corresponding rearward force on the drive pin 102 (see FIG. 4B) to thereby begin to rotate the bistable spring structure body portion 82 in a clockwise direction away from its FIG. 4B stable position and through its previously described intermediate unstable position in which the lobes 92,98 point in opposite horizontal directions as viewed in FIG. 4B.

When the body portion 82 rotationally passes this intermediate rotational unstable position, the springs 108 rotationally snap the body portion 82 to its FIG. 4A rear stable position to thereby decouple the lid housing 30 from the dome sheet 48, rearwardly drive the dome sheet 48 through the balance of its retraction stroke, retract the key caps 40, and resiliently and releasably latch the dome sheet 48 at the rear end of its retraction stroke.

The use of the bistable spring structure 80 to drive the dome sheet 48 through final portions of its elevation and retraction strokes, in respective response to movement of the dome sheet 48 through initial triggering portions of its elevation and retraction strokes, and then resiliently and releasably latch the dome sheet in its fully shifted position to await the next oppositely directed stroke, provides several advantages over the sliding dome sheet drive structure illustrated and described in U.S. Pat. No. 5,602,715.

For example, the primary force used to collapse and elevate the key cap members 40 is supplied by the user's opening of the computer lid. Thus, the maximum available force to elevate and collapse the key cap members is substantially higher than could be practically supplied by a spring mechanism, due to the large mechanical advantage of the computer lid. Additionally, there is no need for overtravel within the keyboard. This simplifies keyswitch actuator design and key hold-down design. Moreover, this design is more favorable to an assembly method which allows the keyboard to be installed as the last part of the computer assembly process.

Another advantage is that there is no large spring force exerted on the dome sheet for extended periods of time during operating and storage conditions. Substantial force is exerted on the dome sheet 48, via the slide bar 54, only during brief moments when the keys are being collapsed or elevated. Thus, the risk of plastics bowing, fatiguing, etc. due to high stress is substantially eliminated. Of course, spring forces are continuously exerted on the shifting mechanism, but only on the relative thick and sturdy drive projection portion 86 of the bistable spring structure 80 as opposed to being exerted on the slide bar 54 and the dome sheet 48.

Because of the incorporation of the bistable spring structure 80 in the dome sheet drive system as described above, problems of limited assembly tolerance between the keyboard and the lid housing are substantially eliminated. Furthermore, in the configuration of the overall dome sheet drive structure described above, the slide bar 54 need not be positioned above the keyboard and under the lid housing's edge to be operatively engaged by the lid housing. This reduction in volume required for the dome sheet drive system advantageously reduces the total size and weight requirement for the overall keyboard assembly, thereby providing more assembly options for securing the keyboard in the computer, and provides the aesthetically desirable option of at least substantially entirely concealing the elevation and retraction mechanism for the collapsible keyboard.

Figure 5:
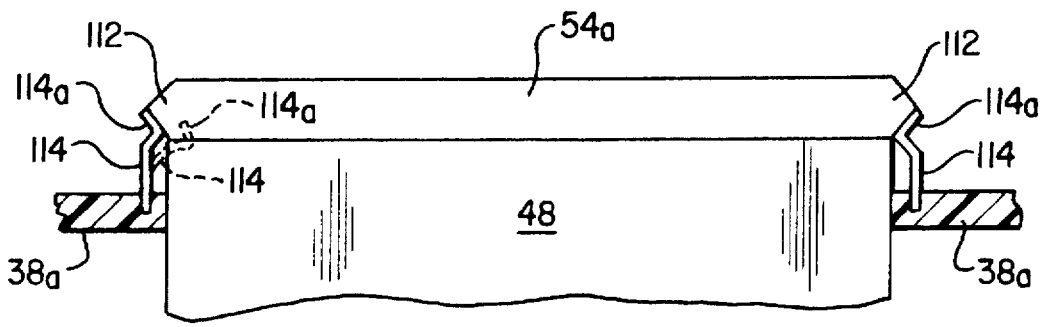
FIG. 5 is a simplified top plan view of a rear portion of the dome sheet and illustrates a first alternate embodiment of the bistable spring structure connected thereto.

Various other forms of the previously described bistable spring structure 80 may be employed to drive the dome sheet 48 through terminal portions of its elevation and retraction strokes, in respective response to forcible movement of the dome sheet 48 through initial portions of its elevation and retraction strokes. For example, a first alternate embodiment of the bistable spring structure 80 is shown in simplified form in FIG. 5 and is used in conjunction with a modified version 54a of the previously described slide bar 54.

The modified slide bar 54a secured to a rear edge portion of the dome sheet 48 has generally V-shaped outer ends 112, and the modified bistable spring structure includes a pair of elongated leaf spring members 114 having inner end portions embedded in monoblock support structure portions 38a positioned adjacent rear side edge portions of the dome sheet 48, and generally V-shaped inturned outer end portions 114a positioned to resiliently and cammingly engage the oppositely sloped surfaces of the slide bar end portions 112 as shown. The unstressed position of one of the springs 114 is shown in phantom in FIG. 5.

Figure 5A:
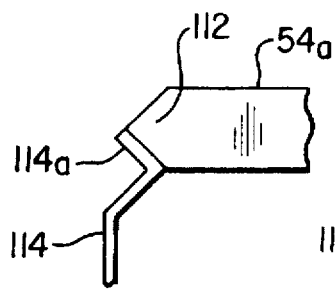
FIGS. 5A–5C are enlarged scale simplified top plan views of an actuating bar portion of the dome sheet and sequentially illustrate the action of the first alternate bistable spring structure thereon.
Figure 5B:
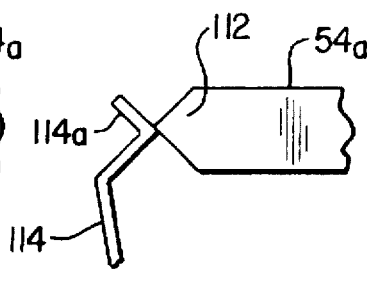

In FIG. 5A the slide bar 54a is shown in its rearward limit position ("rearward" being toward the top in FIGS. 5–5C) in which it is resiliently and releasably latched by the springs 114, with bistable spring structure being in its rear stable position, and the spring end portions 114a being resiliently urged against the forwardmost sloping surfaces of the generally V-shaped end portions 112 of the slide bar 54a. FIG. 5B illustrates the slide bar 54a having been forwardly moved (by the previously described lid housing drive linkage) to correspondingly cam the spring ends 114a out to their intermediate unstable position in which the apexes of the spring end portions 114a engage the corresponding apexes of the slide bar end portions 112.

Figure 5C:
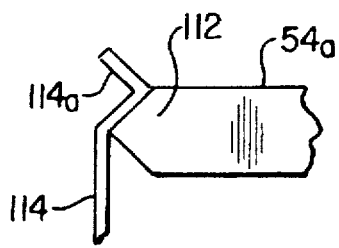
Figure 6:
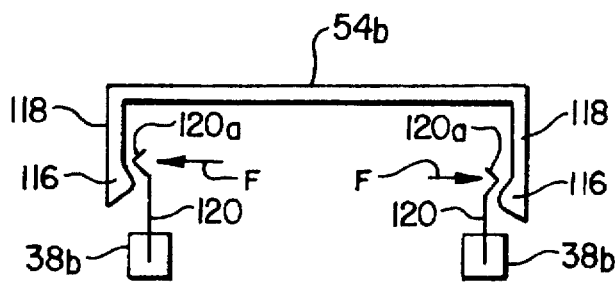
FIG. 6 is a schematic top plan view of a first alternate embodiment of the actuating bar operatively associated with a second alternate embodiment of the bistable spring structure.

As the slide bar 54a is moved further forwardly from its FIG. 5B position, the springs 114 snap inwardly toward each other to their FIG. 5C forward stable positions to thereby cause the spring end portions 114a to drive the slide bar 54a, and thus the dome sheet 48, through the balance of its forward retraction stroke. It can be readily seen that by rearwardly moving the slide bar 54a from its FIG. 5C stable position through its FIG. 5B unstable position will cause the springs 114 to automatically drive the slide bar 54a, and thus the dome sheet 48, through the balance of its rearward retraction stroke in which the springs 114 once again assume their FIG. 5A rear stable position.

Further possible alternate embodiments of the bistable spring structure 80 are schematically shown in FIGS. 6–11. For example, in FIG. 6, the slide bar 54b is generally U-shaped, with inturned, generally V-shaped facing lobes 116 formed on the transverse opposite end portions 118 of the slide bar 54b. A pair of elongated leaf spring members 120 have inner end portions embedded in portions 38b of the monoblock support structure 38, and generally V-shaped outer end portions 120a which are positioned inwardly of and cammingly engage the lobes 116, exerting oppositely directed forces F thereon. As can be seen, forced movement of the slide bar lobes 116 forwardly and rearwardly past the spring end portions 120a moves the springs 120 from first stable positions through unstable intermediate positions to second stable positions.

Figure 7:
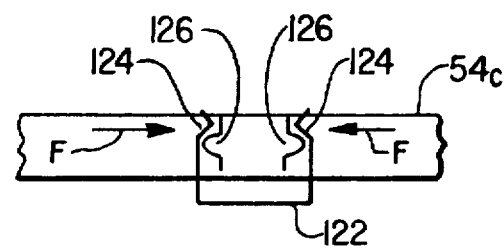
FIG. 7 is a schematic top plan view of a second alternate embodiment of the actuating bar operatively associated with a third alternate embodiment of the bistable spring structure.

A third alternate embodiment of the bistable spring structure 80 is schematically illustrated in FIG. 7 and includes a suitably supported, generally U-shaped spring member 122 having V-shaped lobes 124 on its free outer ends. The spring lobes 124 cammingly engage corresponding lobes 126 on the slide bar 54c and exert opposite inwardly directed forces F thereon.

Figure 8:
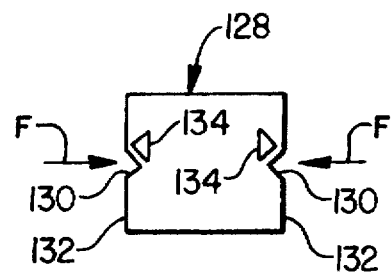
FIGS. 8 and 9, respectively, are schematic top plan views of fourth and fifth alternate embodiments of the bistable spring structure.

A fourth alternate embodiment of the bistable spring structure 80 is schematically illustrated in FIG. 8 and includes a suitably anchored rectangularly shaped spring member 128 with inturned, generally V-shaped lobes 130 on opposite side portions 132 thereof. The spring side portions 132 are positioned outwardly of corresponding slide bar lobes 134, with the spring lobes 130 cammingly engaging the slide bar lobes 134 and exerting opposite inwardly directed resilient forces F thereon.

Figure 9:
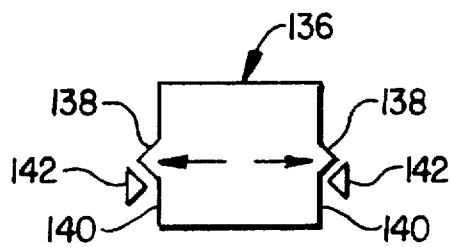

A fifth alternate embodiment of the bistable spring structure 80 is schematically illustrated in FIG. 9 and includes a suitably anchored rectangularly shaped spring member 136 with outwardly projecting, generally V-shaped lobes 138 on opposite side portions 140 thereof. The spring side portions 140 are positioned outwardly of corresponding slide bar lobes 142, with the spring lobes 138 cammingly engaging the slide bar lobes 142 and exerting opposite outwardly directed resilient forces F thereon.

Figure 10A:
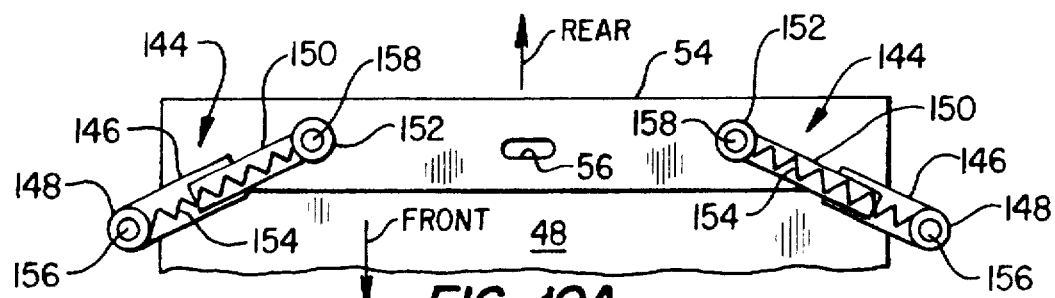
FIGS. 10A–10C are schematic top plan views of a sixth alternate embodiment of the bistable spring structure and sequentially illustrate its operation on the dome sheet.
Figure 10B:
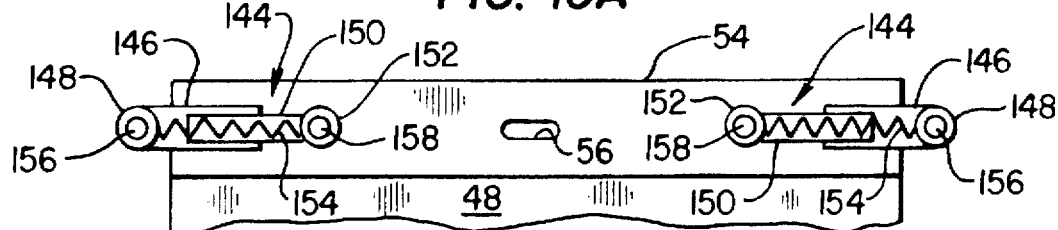
Figure 10C:
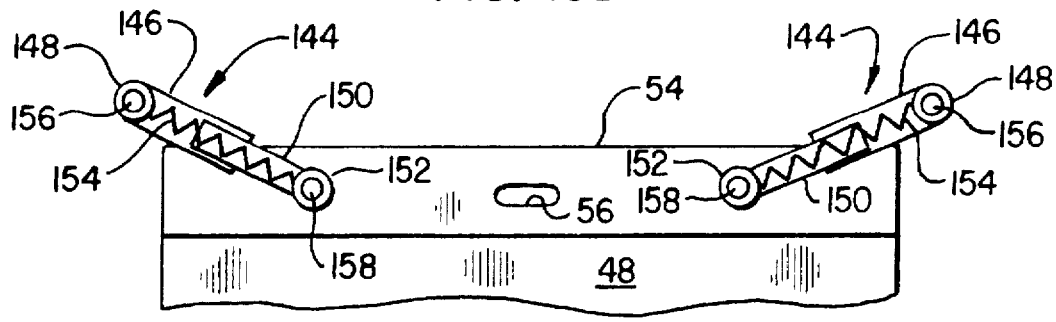
Figure 11:
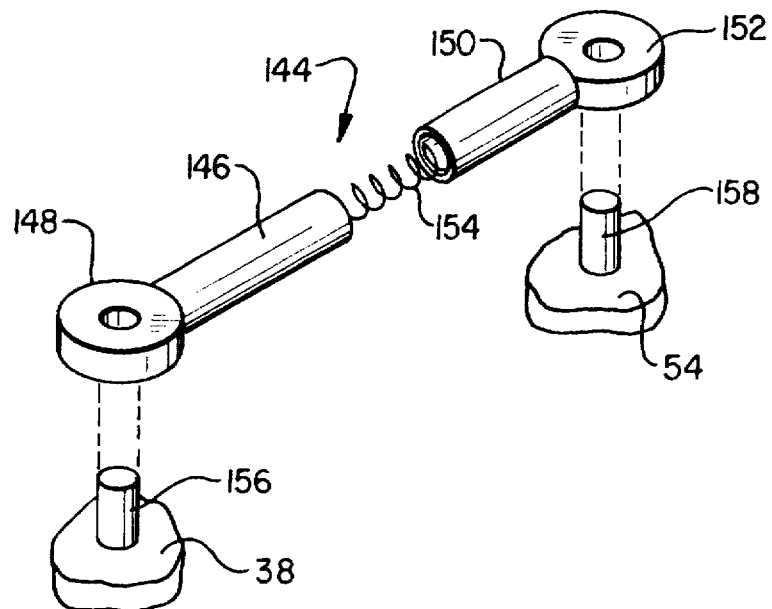
FIG. 11 is an enlarged scale exploded perspective view of a spring-loaded tie rod portion of the bistable spring structure shown in FIGS. 10A–10C.

A sixth alternate embodiment of the bistable spring structure 80 is shown in simplified form in FIGS. 10A–11 and includes a pair of spring-loaded telescoped tie rod assemblies 144 pivotally interconnected between the monoblock support structure 38 and the slide bar 54. Each tie rod assembly 144 includes an outer tubular member 146 with an outer annular connection end section 148, and a smaller diameter inner tubular member 150 with an outer annular connection end section 152. The inner tubular member 150 is slidingly telescoped within the outer tubular member 146, with the telescoped outer and inner members 146,150 being resiliently urged axially away from one another by an internal compression spring member 154. The connection end section 148 is pivotally retained on a pin 156 on the monoblock structure 38 or the metal backing sheet 46, and the connection end section 152 is pivotally retained on a pin 158 on the slide bar 54.

In FIG. 10A the dome sheet 48 is at the rear end of its retraction stroke, and the spring-loaded tie rod assemblies 144 are in a rearwardly and horizontally inwardly sloped first stable position thereof. As the dome sheet 48 is forwardly moved through an initial portion of its elevation stroke to its FIG. 10B position (by the previously described lid housing drive linkage), the tie rod assemblies 144 are pivoted toward one another to a shortened, unstable intermediate position in which they are generally parallel to the length of the slide bar 54. A further forward movement of the dome sheet 48 past this unstable position causes the tie rod assemblies 144 to extend and forwardly pivot to their FIG. 10C second stable positions in which the springs 154 have driven the dome sheet 48 forwardly through the balance of its elevation stroke.

A subsequent lid housing-driven rearward movement of the dome sheet 48 from its FIG. 10C position through an initial portion of its retraction stroke pivots the spring-loaded tie rod assemblies 144 through their FIG. 10B unstable positions at which point the springs 154 take over from the lid housing drive linkage and drive the dome sheet 48 rearwardly through the balance of its retraction stroke, thereby pivotally returning the tie rod assemblies 144 to their FIG. 10A stable positions.

Figure 12:
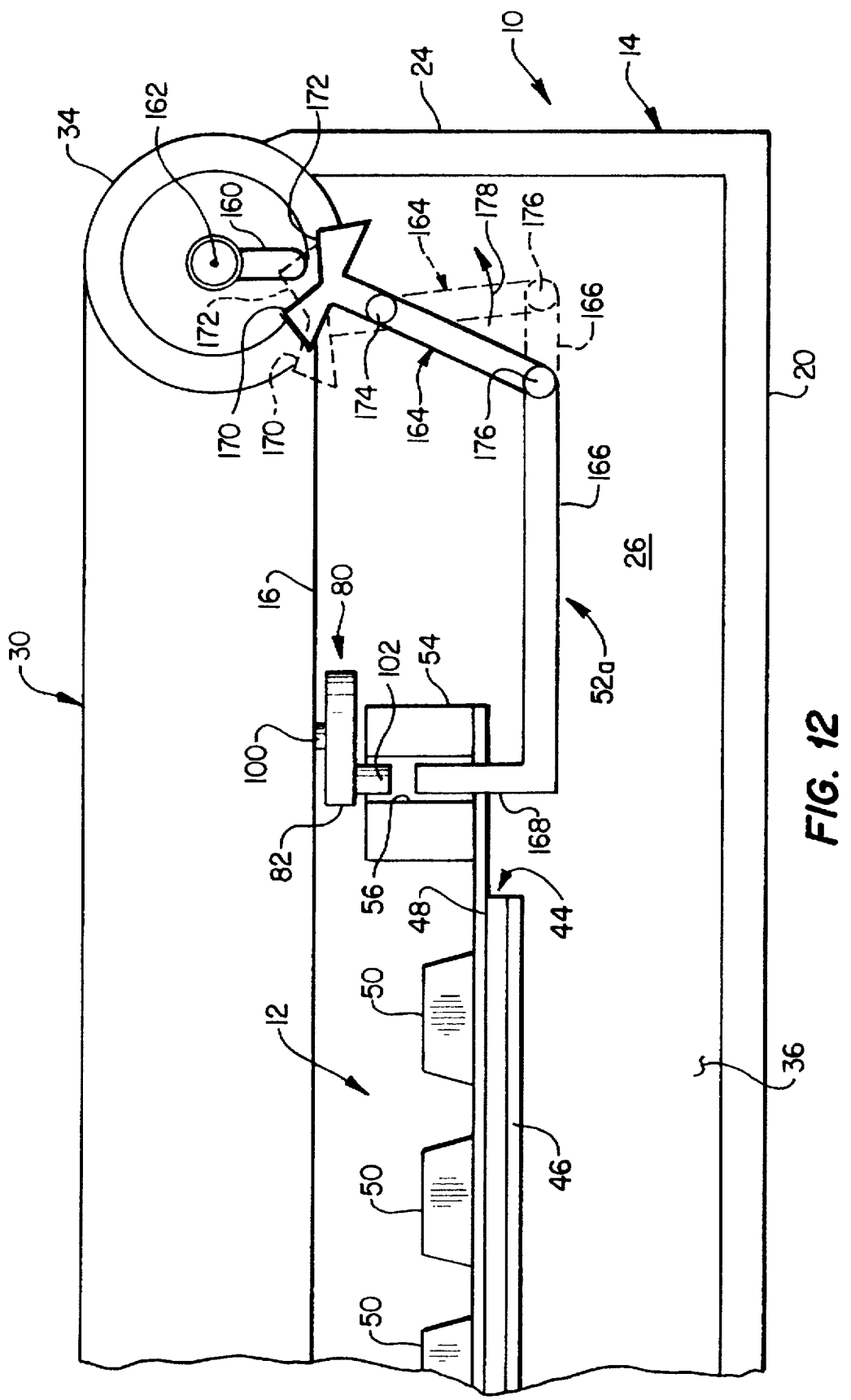
FIG. 12 is an enlarged scale simplified cross-sectional view through a rear portion of the notebook computer illustrating the operation of an alternate embodiment of the FIG. 3 linkage structure.

An alternate embodiment 52a of the previously described lid housing-to-dome sheet linkage structure 52 is illustrated in simplified form in FIG. 12 and may be utilized in design situations in which it is desirable to reverse the previously described directions of the elevation and retraction strokes of the dome sheet 48—i.e., to elevate the key cap members 40 by moving the dome sheet 48 rearwardly in response to opening the lid housing 30, and to retract the key cap members 40 by moving the dome sheet 48 forwardly in response to closing the lid housing 30.

The modified linkage structure 52a includes a striker member 160 which is pivotable about the rotational axis 162 of the lid housing 30; an elongated, generally T-shaped lever member 164; and a horizontal drive bar 166 having an upturned front end portion 168 received as shown in the slide bar slot 56. The transverse upper end of the lever member 164 has mutually angled, upwardly facing front and rear ramp surfaces 170 and 172, and the lever member 164 is supported, as at 174, for pivotal movement between its solid and dotted line positions about a horizontal axis positioned rearwardly of the slide bar 54 and extending parallel to its length. The lower end of the lever member 164 is pivoted, as at 176, to the rear end of the drive bar 166.

With the lid housing 30 in its FIG. 12 closed position, the linkage 52a is in its solid line position, dome sheet 48 is at the forward end of its forward retraction stroke, and the key cap members 40 (not shown in FIG. 12) are in their retracted storage and transport orientations. As the lid housing 30 is opened by pivoting it in a clockwise direction from its FIG. 12 position, the striker member 160 forcibly engages and travels along the front lever member ramp surface 170 to thereby forcibly rotate the lever member 164 in a counterclockwise direction, as indicated by the arrow 178 about pivot point 174 toward the dotted line position of the lever member 174.

Via the drive bar 166, this moves the dome sheet 48 through an initial triggering portion of its rearwardly directed elevation stroke in a manner moving the bistable spring structure 80 (or one of the several alternate embodiments thereof as the case may be) from one of its stable positions and through its central unstable position as previously described. At this point, the striker member 160 disengages from the ramp surface 170, and the bistable spring structure 80 takes over, drives the dome sheet to the rear end of its rearwardly directed elevation stroke, and causes the linkage 52a to finish its pivotal movement to its dotted line position in FIG. 12 at which point the key cap members 40 are elevated to their use orientations.

When the lid housing is subsequently closed, the sequence is reversed. With the lever member now in its dotted line position, the striker member (which is now rotating in a clockwise direction) forcibly engages and travels along the ramp surface 172, thereby rotating the lever member 164 in a clockwise direction about the pivot point 174 and moving the dome sheet 48 forwardly through an initial triggering portion of its forwardly directed retraction stroke, after which the bistable spring structure 80 takes over and drives the dome sheet 48 forwardly through the balance of its retraction stroke to collapse the key cap members 40 to their storage and transport orientations.

As in the case of the previously described linkage 52, during opening of the lid housing 30, the striker member 160 preferably engages the lever member 164 only during about the first 45 degrees of pivotal motion of the lid housing. Similarly, as the lid housing 30 is being closed, it drivingly engages the lever member 164 only during about the last 45 degrees of pivotal motion of the lid housing.

The foregoing detailed description is to be clearly understood as being given by way of illustration and example only, the spirit and scope of the present invention being limited solely by the appended claims.

What is claimed is:

1. Collapsible keyboard apparatus comprising:
   a plurality of keys supported for movement between elevated and retracted positions;
   a first structure operative to (1) shift said keys from said retracted positions to said elevated positions and (2) permit said keys to move from said elevated positions to said retracted positions in response to movement of said first structure respectively through (1) an elevation stroke and (2) a retraction stroke; and
   a second structure connected to said first structure and operative in response to a triggering movement of said first structure through an initial portion of either of said elevation and retraction strokes to (1) drive said first structure through the balance of the stroke, and then (2) releasably retain said first structure in the resulting stroke end position thereof.

2. The collapsible keyboard apparatus of claim 1 wherein said collapsible keyboard apparatus is a portable computer keyboard.

3. The collapsible keyboard apparatus of claim 2 wherein said portable computer keyboard is a notebook computer keyboard.

4. The collapsible keyboard apparatus of claim 1 wherein said elevation and retraction strokes are oppositely directed strokes.

5. The collapsible keyboard apparatus of claim 1 wherein said first structure includes a base member having disposed thereon a spaced series of resilient key return members operative to underlie and support said keys in said elevated positions thereof in response to movement of said first structure through said elevation stroke, and to permit said keys to move to said retracted positions in response to movement of said first structure through said retraction stroke.

6. The collapsible keyboard apparatus of claim 5 wherein said base member is a dome sheet and said resilient key return members are elastomeric key return dome members.

7. The collapsible keyboard apparatus of claim 6 further comprising a slide bar member secured to said dome sheet and being movable in opposite directions to move said dome sheet through said elevation and retraction strokes.

8. The collapsible keyboard apparatus of claim 1 wherein said second structure is a bistable spring structure.

9. The collapsible keyboard apparatus of claim 8 wherein said bistable spring structure includes a body portion supported for rotation relative to said first structure and drivingly connected thereto, and spring means for engaging said body portion in a manner permitting said body portion to rotate between two stable positions through an intermediate unstable position.

10. The collapsible keyboard apparatus of claim 9 wherein:
said first structure has a slot therein,
said body portion has a drive pin received in said slot, and
said spring means exert generally oppositely directed forces on said body portion in directions generally transverse to its rotational axis.

11. The collapsible keyboard apparatus of claim 8 wherein:
said first structure has spaced pairs of oppositely ramped drive surfaces, and
said bistable spring structure includes a pair of spring members supported adjacent said spaced pairs of oppositely ramped drive surfaces and having generally V-shaped end portions resiliently engaging said drive surfaces.

12. The collapsible keyboard apparatus of claim 8 wherein:
said first structure has spaced pairs of oppositely ramped drive surfaces, and
said bistable spring structure includes a generally U-shaped spring member having generally V-shaped free end portions resiliently engaging said drive surfaces.

13. The collapsible keyboard apparatus of claim 8 wherein:
said first structure has spaced pairs of oppositely ramped drive surfaces, and said bistable spring structure includes a generally rectangular spring member having opposite side portions with generally V-shaped protrusions formed thereon and resiliently engaging said drive surfaces.

14. The collapsible keyboard apparatus of claim 13 wherein said protrusions are inwardly directed protrusions.

15. The collapsible keyboard apparatus of claim 13 wherein said protrusions are outwardly directed protrusions.

16. The collapsible keyboard apparatus of claim 8 wherein said bistable spring structure includes a pair of telescoped, axially spring-biased tie rod assemblies each having a first end pivotally connected to said first structure, and a second end pivotally supported external to said first structure.

17. An electronic device comprising:
a housing;
a lid mounted on said housing for pivotal movement relative thereto between open and closed positions; and
a collapsible keyboard carried by said housing and including:
a plurality of keys supported for movement between elevated and retracted positions;
a first structure operative to (1) shift said keys from said retracted positions to said elevated positions and (2) permit said keys to move from said elevated positions to said retracted positions in response to movement of said first structure respectively through (1) an elevation stroke and (2) a retraction stroke; and
a second structure connected to said first structure and operative in response to a triggering movement of said first structure through an initial portion of either of said elevation and retraction strokes to (1) drive said first structure through the balance of the stroke, and then (2) releasably retain said first structure in the resulting stroke end position thereof.

18. The electronic device of claim 17 wherein said electronic device is a portable computer.

19. The electronic device of claim 18 wherein said portable computer is a notebook computer.

20. The electronic device of claim 17 wherein said elevation and retraction strokes are oppositely directed strokes.

21. The electronic device of claim 20 wherein said second structure is a bistable spring structure.

22. A portable computer comprising:
a base housing;
a lid portion secured to said base housing for pivotal movement relative thereto between open and closed positions;
a collapsible keyboard carried by said base housing and including:
a plurality of keys supported for movement between elevated and retracted positions, and
shifting means operative to (1) shift said keys from said retracted positions to said elevated positions and (2) permit said keys to move from said elevated positions to said retracted positions in response to movement of said shifting means respectively through (1) an elevation stroke and (2) a retraction stroke;
triggering means for moving said shifting means through initial portions of said elevation and retraction strokes in respective response to movement of said lid portion toward said open and closed positions thereof; and
final drive means for moving said shifting means through final portions of said elevation and retraction strokes in respective response to movement of said shifting means by said triggering means through said initial portions of said elevation and retraction strokes.

23. The portable computer of claim 22 wherein said portable computer is a notebook computer.

24. The portable computer of claim 22 wherein said final drive means include a bistable spring structure operatively connected to said shifting means.

25. The portable computer of claim 22 wherein said triggering means are operative only during an initial portion of the opening movement of said lid portion, and a final portion of the closing movement of said lid portion.

26. The portable computer of claim 25 wherein said final drive means include a bistable spring structure operatively connected to said shifting means.

27. A portable computer comprising:

a base housing;

a lid housing mounted on said base housing for pivotal movement relative thereto between open and closed positions;

a collapsible keyboard carried by said base housing and including:
- a plurality of keys supported for movement between elevated and retracted positions, and
- a shifting structure operative to (1) shift said keys from said retracted positions to said elevated positions and (2) shift said keys from said elevated positions to said retracted positions in respective response to movement of said shifting structure through elevation and retraction strokes;

a linkage structure drivingly connected to said shifting structure and being engageable by said lid portion during an initial portion of its opening movement to drive said shifting structure through an initial portion of said elevation stroke, and engageable by said lid portion during a final portion of its closing movement to drive said shifting structure through an initial portion of said retraction stroke; and a bistable spring structure drivingly connected to said shifting structure for moving said shifting structure through final portions of said elevation and retraction strokes, and then releasably and resiliently retaining said shifting structure in the resulting stroke end position thereof, in respective response to movement of said shifting structure through said initial portions of said elevation and retraction strokes.

28. The portable computer of claim 27 wherein said portable computer is a notebook computer.

29. The portable computer of claim 27 wherein said shifting structure includes a sheet member having mounted on a side thereof a mutually spaced series of resilient key return spring members, and said linkage structure and said bistable spring structure are connected to said sheet member.

30. The portable computer of claim 29 wherein said resilient key return spring members are elastomeric dome members.

31. The portable computer of claim 27 wherein said elevation and retraction strokes are oppositely directed.

32. The portable computer of claim 31 wherein said base housing has a front side, and said elevation stroke is forwardly directed.

33. The portable computer of claim 31 wherein said base housing has a front side, and said elevation stroke is rearwardly directed.

34. The portable computer of claim 27 wherein said linkage structure is engaged by said lid housing only during said initial portion of said opening movement of said lid housing and said final portion of said closing movement of said lid housing.

35. The portable computer of claim 27 wherein said linkage structure includes:

a striker member carried by said lid housing, a pivotally supported lever member having first and second differently sloped ramp surfaces respectively engageable by said striker member as said lid housing is being opened and closed to cause pivotal movement of said lever member in opposite directions, and a drive member interconnected between said shifting structure and said lever member and being translatable in response to rotation of said lever member.

36. The portable computer of claim 27 wherein said bistable spring structure includes a body portion supported for rotation relative to said shifting structure and drivingly connected thereto, and a spring portion engaging said body portion in a manner permitting said body portion to rotate between two stable positions through an intermediate unstable position.

37. The portable computer of claim 36 wherein:

said shifting structure has a slot therein, said body portion has a drive pin received in said slot, and said spring portion exerts generally oppositely directed forces on said body portion in directions generally transverse to its rotational axis.

38. The portable computer of claim 27 wherein:

said shifting structure has spaced pairs of oppositely ramped drive surfaces, and said bistable spring structure includes a pair of spring members supported adjacent said spaced pairs of oppositely ramped drive surfaces and having generally V-shaped end portions resiliently engaging said drive surfaces.

39. The portable computer of claim 27 wherein:

said shifting structure has spaced pairs of oppositely ramped drive surfaces, and said bistable spring structure includes a generally U-shaped spring member having generally V-shaped free end portions resiliently engaging said drive surfaces.

40. The portable computer of claim 27 wherein:

said shifting structure has spaced pairs of oppositely ramped drive surfaces, and said bistable spring structure includes a generally rectangular spring member having opposite side portions with generally V-shaped protrusions formed thereon and resiliently engaging said drive surfaces.

41. The portable computer of claim 40 wherein said protrusions are inwardly directed protrusions.

42. The portable computer of claim 40 wherein said protrusions are outwardly directed protrusions.

43. The portable computer of claim 27 wherein said bistable spring structure includes a pair of telescoped, axially spring-biased tie rod assemblies each having a first end pivotally connected to said shifting structure, and a second end pivotally supported external to said shifting structure.

* * * * *